(12) United States Patent
Komi et al.

(10) Patent No.: US 7,907,812 B2
(45) Date of Patent: Mar. 15, 2011

(54) IMAGE AND AUDIO RECORDING/REPRODUCING APPARATUS

(75) Inventors: Hironori Komi, Tokyo (JP); Susumu Yoshida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1127 days.

(21) Appl. No.: 11/637,988

(22) Filed: Dec. 12, 2006

(65) Prior Publication Data

US 2007/0154183 A1    Jul. 5, 2007

(30) Foreign Application Priority Data

Dec. 22, 2005   (JP) ................ 2005-369023

(51) Int. Cl.
*H04N 5/91*    (2006.01)
*H04N 7/00*    (2006.01)

(52) U.S. Cl. ......................... 386/113; 386/66
(58) Field of Classification Search .......... 386/113, 386/66, 46, 100, 21
See application file for complete search history.

(56) References Cited

U.S. PATENT DOCUMENTS

| | | | | |
|---|---|---|---|---|
| 5,583,652 A | * | 12/1996 | Ware | 386/75 |
| 7,596,299 B2 | * | 9/2009 | Takagi et al. | 386/68 |
| 2004/0208135 A1 | | 10/2004 | Nakamura et al. | |
| 2005/0025459 A1 | | 2/2005 | Kato et al. | |

FOREIGN PATENT DOCUMENTS

| | | |
|---|---|---|
| EP | 1206141 | 5/2002 |
| EP | 1206141 A2 | 5/2002 |
| JP | 09-293330 A | 11/1997 |
| JP | 11-238359 | 8/1999 |
| JP | 2002-152688 A | 5/2002 |
| WO | WO2005/029854 A1 | 3/2005 |

OTHER PUBLICATIONS

Japan Patent Office (JPO) office action for JPO patent application JP2005-369023 (Sep. 16, 2009).

* cited by examiner

*Primary Examiner* — Robert Chevalier
(74) *Attorney, Agent, or Firm* — Kilpatrick Townsend & Stockton LLP

(57) ABSTRACT

An image and audio recording/reproducing apparatus, comprising: an input portion, into which image/audio data are inputted; a recording/reproducing module, which is configured to record/reproduce the image/audio data onto a recording medium; and a controller module, which is configured to make such control of producing reproduction time information corresponding to timing of inputting the second image/audio data with respect to reproduction time of the first image/audio data, additionally recording the second image/audio data onto the recording medium together with the reproduction time information, separating from the first image/audio data, and reproducing the second image/audio data upon basis of timing of the reproduction time information when the first image/audio data is reproduced next time, if the second image/audio data is inputted from the input portion when reproducing the first image/audio data recorded on the recording medium, thereby providing an apparatus for producing and adding other image/audio data in synchronism with the image/audio data, which is recorded onto the recording medium once, cheaply, as well as, increasing a usability at that time.

12 Claims, 7 Drawing Sheets

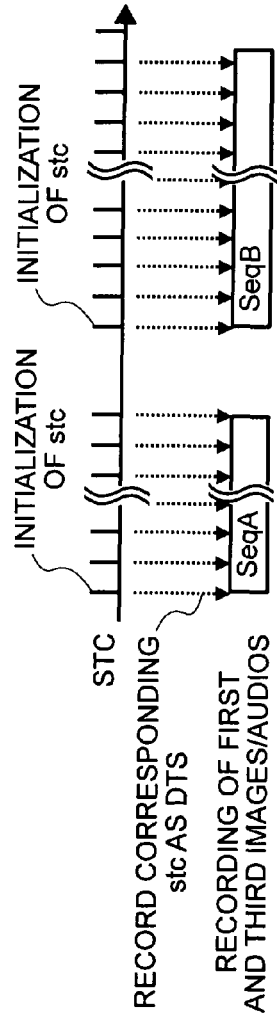
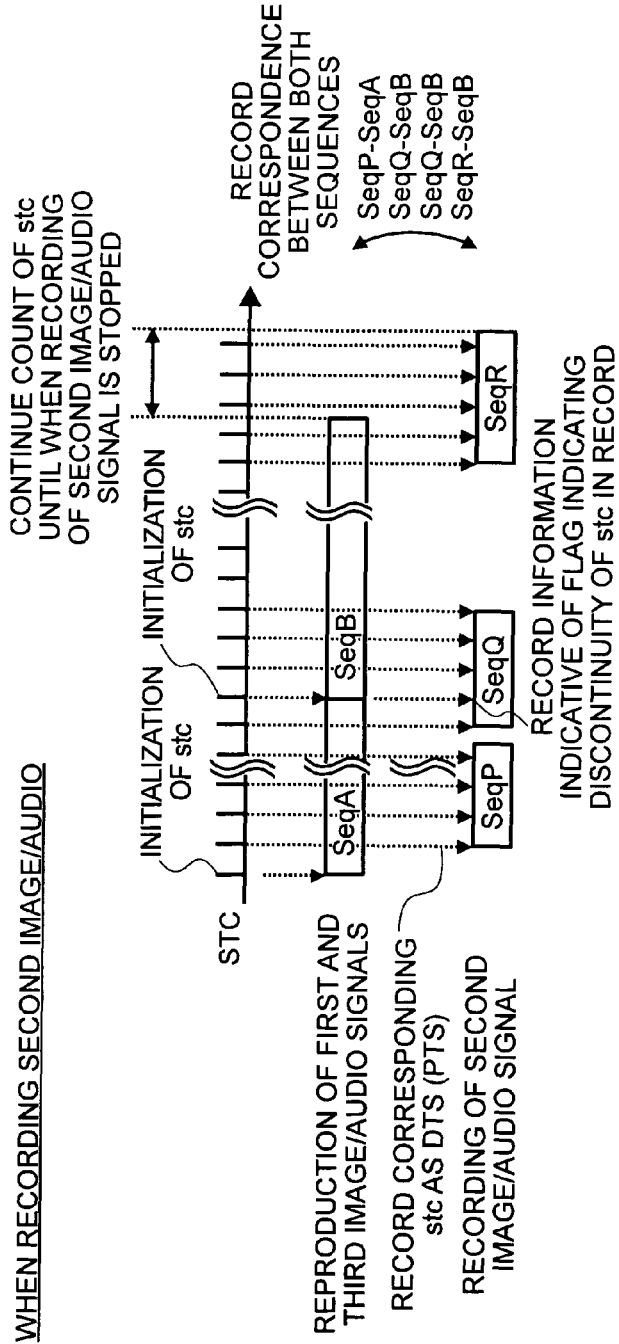

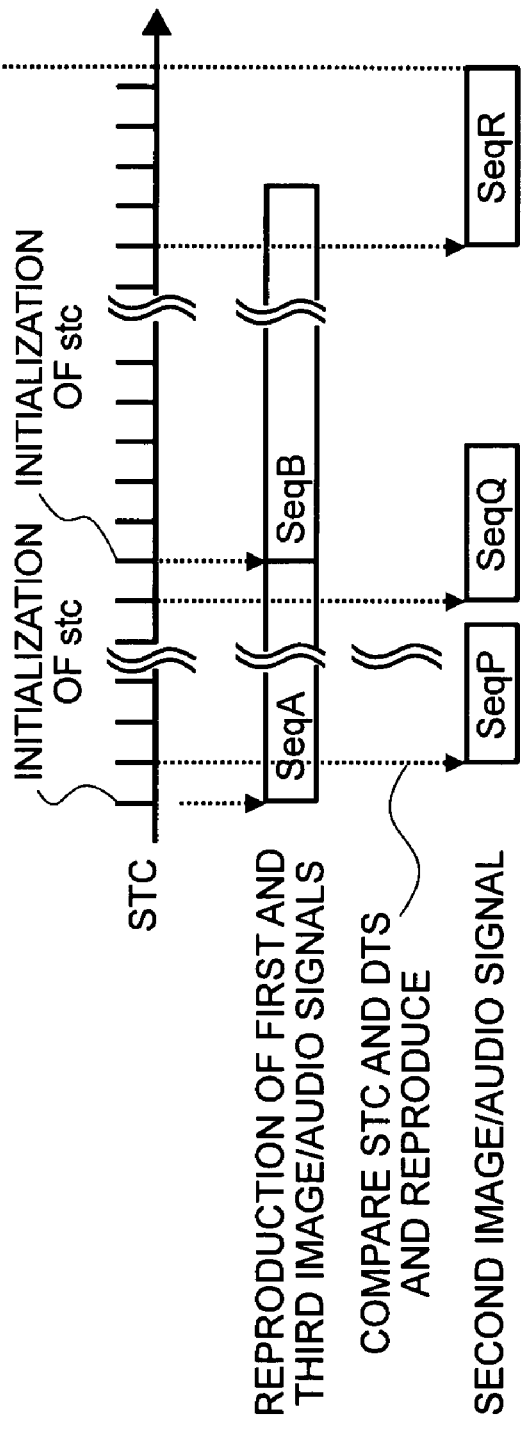

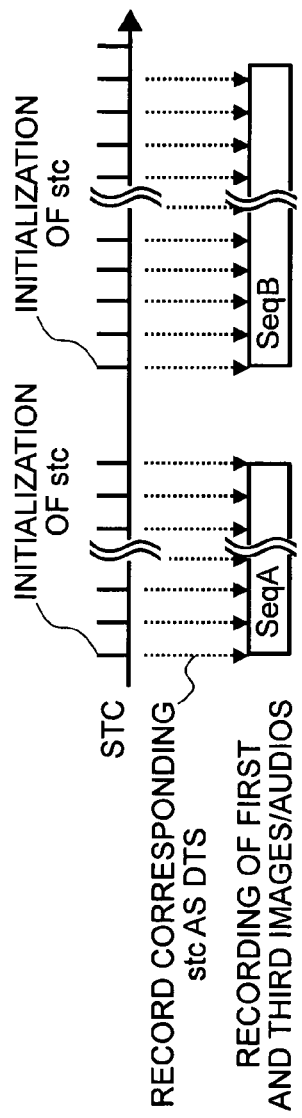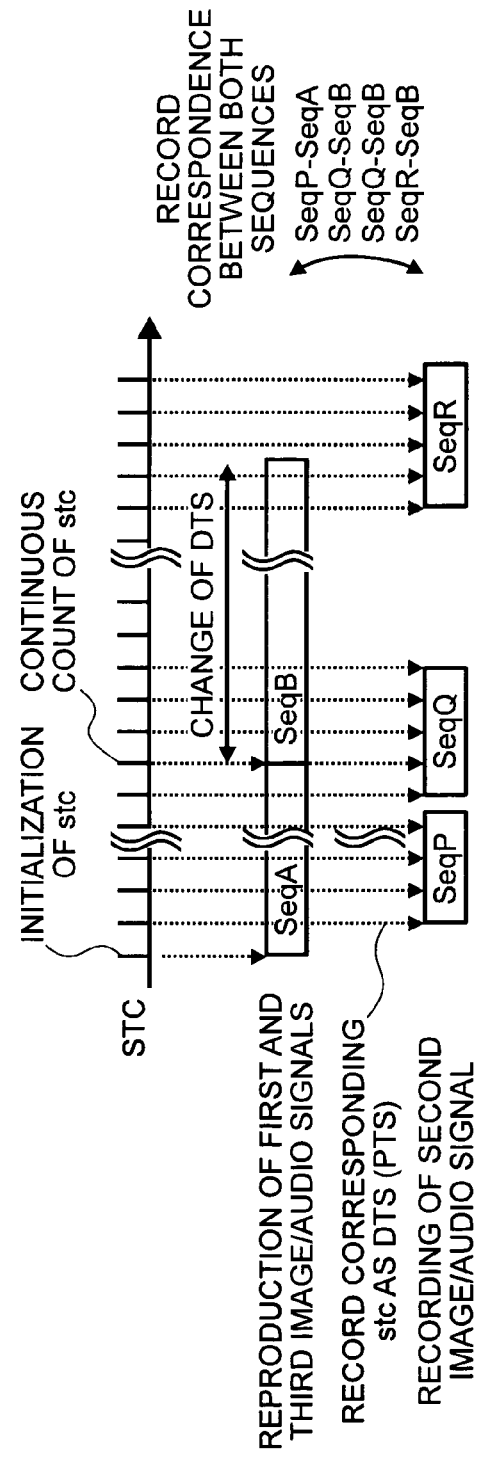

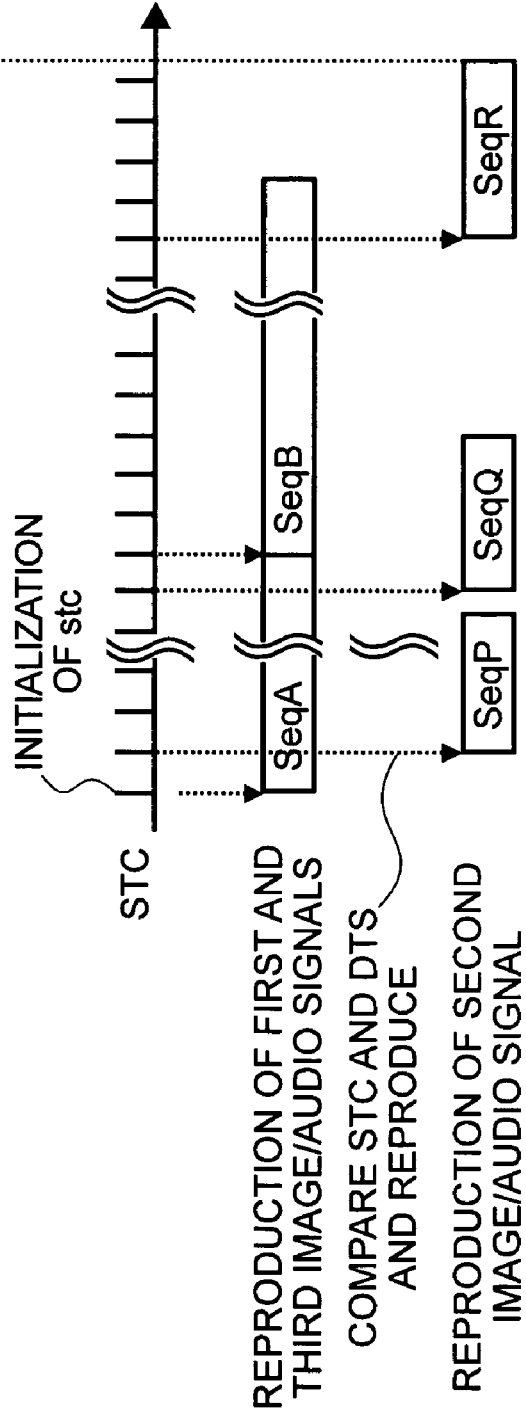

IMAGE AND AUDIO RECORDING/REPRODUCING APPARATUS

BACKGROUND OF THE INVENTION

The present invention relates to an image and audio recording/reproducing apparatus for coding and recording an image and audio signal.

As a background art relating to the present technical field is already known Japanese Patent Laying-Open No. Hei 11-238359 (1999), for example. In that publication is described "for providing an image recording/reproducing apparatus enabling to obtain a superior utility, such as, obtaining high-degree of freedom relating to recording", as a problem to be dissolved, there is described "the image recording/reproducing apparatus is so constructed that it can record sub-image data by making relation to main image data while conducting reproducing of the main image data in parallel with, when newly conducting additional recording of the sub-image data relating to the main image data, which is already recorded in a recording medium 6 made from a solid memory, and it can reproduce the sub-image data, which is related to the main data by linking to reproducing of that main image data, when reproducing", as the means for dissolving.

BRIEF SUMMARY OF THE INVENTION

There are already known image and audio signal recording/reproducing apparatuses for recording the image and audio signal coded onto a recording medium, such as DVD or HDD, etc. Accompanying with an improvement on large-sizing of recording capacity and speedup of reading/writing from/onto the medium, some of those apparatuses are loaded with a function, such as, run-after reproducing, for example, i.e., reproducing the data already recorded running after while recording it. Those technologies are based on a digital coding compression technology, such as, MPEG2 technology (ISO/IEC 13818-1 through 3), for example, representatively.

In future, there is a necessity of way of using, such as, coding the image and audio streams to be recorded onto one (1) recording medium, while outputting it simultaneously. For example, the way of using for adding a commentary picture onto the image which was once taken by means of a video camera apparatus.

In the Japanese Patent Laying-Open No. Hei 11-238359 (1999), although there is description "it records sub-image data by making relation to main image data while conducting reproducing of the main image data in parallel with, when newly conducting additional recording of the sub-image data relating to the main image data, which is already recorded in a recording medium 6 made from a solid memory, and it reproduces the sub-image data, which is related to the main data by linking to reproducing of that main image data, when reproducing", however no explanation is given on when the sub-image data is reproduced, or how the synchronization is taken, with respect to reproducing of the main image. Nor, no consideration is paid on an aspect of additionally recording a plural number of sub-images to one (1) piece of the main image.

Thus, in case when wishing to record the sub-images, additionally, but only at each of portions desired on the main image, for example, additionally recording a first sub-image in a first half of one (1) piece of the main image, additionally recording a second sub-image in a middle thereof, and additionally recording a third sub-image in a last half thereof, however according to the invention described in the Japanese Patent Laying-Open No. Hei 11-238359 (1999), it is only possible to make a deal with of one by one, and since no control is made on the timing of reproducing the main image and the sub-image, therefore it is impossible to obtain such a scene of practical use as was mentioned above.

Also, there are cases of wishing to change the timing of reproducing the sub-image, after additionally recording the sub-image once, with respect to the main image. However, with the Japanese Patent Laying-Open No. Hei 11-238359 (1999), since no control is made on the timing of reproducing the main image and the sub-image, therefore it is impossible to change the timing of reproducing.

Such additional recording of the sub-image only to the respective portions desired on the main image and/or changing the timing for reproducing the sub-images can be importance function(s), which will appears or be needed, frequently, within the actual using scene of the image and audio recording/reproducing apparatus, and it can be said that the image and audio recording/reproducing apparatus achieving such the function(s) be superior in the usability thereof.

An object is, according to the present invention, to provide an image and audio recording/reproducing apparatus enabling to achieve an improvement in the usability thereof.

The object mentioned above is accomplished, for example, by an image and audio recording/reproducing apparatus, comprising: an input portion, into which image/audio data are inputted; a recording/reproducing module, which is configured to record/reproduce the image/audio data onto a recording medium; and a controller module, which is configured to make such control of producing reproduction time information corresponding to timing of inputting said second image/audio data with respect to reproduction time of the first image/audio data, additionally recording said second image/audio data onto said recording medium together with said reproduction time information, separating from said first image/audio data, and reproducing said second image/audio data upon basis of timing of said reproduction time information when said first image/audio data is reproduced next time, if the second image/audio data is inputted from said input portion when reproducing the first image/audio data recorded on said recording medium.

BRIEF DESCRIPTION OF THE DRAWING

Those and other features, and objects advantages of the present invention will become more apparent from the following detailed description when taken in conjunction with the accompanying drawings wherein:

FIG. 3 is a view for showing relationships among first, second and third image/audio signals and STC, according to an embodiment 2

FIG. 4 is a view for showing relationships among first, second and third image/audio signals and STC, according to an embodiment 3;

DETAILED DESCRIPTION OF THE INVENTION

Hereinafter, embodiments according to the present invention will be fully explained by referring to the attached drawings.

Embodiment 1

The present embodiment relates to a digital video camera, using an optical disk as a recording medium therein, has a function of reproducing a first coded image/audio data, which was recorded once, and recording other second coded image/audio data thereon during the said reproducing operation, and also, having a function of outputting the first and second image/audio data, thereafter, in the form of a picture-in-picture screen, when reproducing them.

Figure 1:
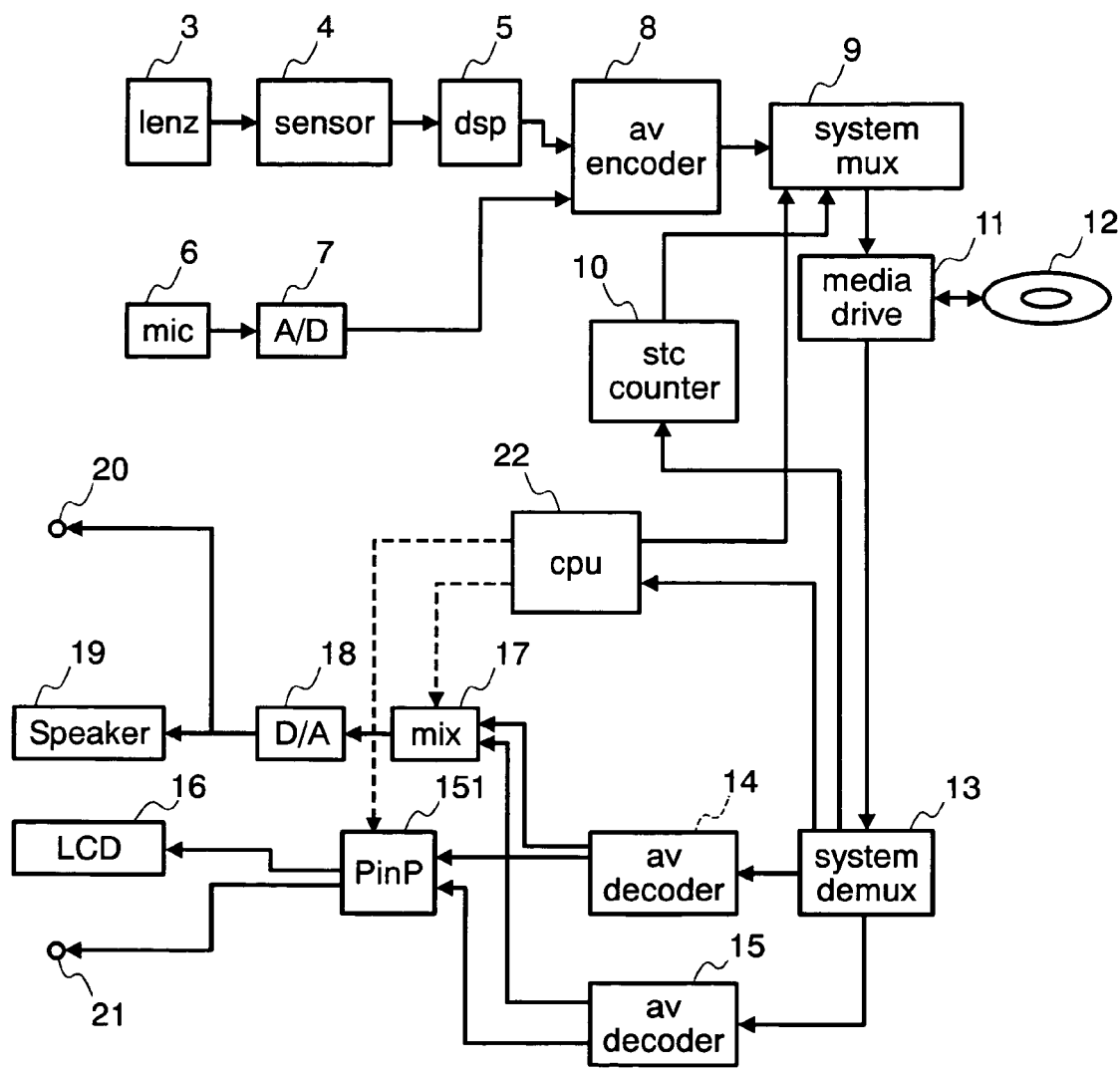
FIG. 1 is a block diagram for showing a video camera, according to an embodiment 1 of the present invention.

FIG. 1 shows the block diagram of the embodiment 1. Hereinafter, explanation will be made, by referring to this figure. First of all, explanation will be made on the operations when recording normal first coded image/audio data. Upon pushing down of a record-start button not shown in the figure by a user, a CPU 22 controls each of blocks 1 through 11, and thereby conducting the recording operation. An image signal taken or picked up through a lens portion 3 is converted into an electric signal through a sensor portion 4, such as, of a CCD or the like, for example, and it is processed within a signal processor portion 5 in the form of a digital image signal, to be transmitted to an Audio/Video coding block 8. On the other hand, audio is taken or picked up through a microphone portion 6, and it is converted into a digital audio data within an analog/digital converter block, to be transmitted into the Audio/Video coding block 8. Within the Audio/Video coding block, the image and the audio signals are coded into an elementary stream (ES), in accordance with the standard, such as, image of MPEG 2 and MPEG 1 Layer II. Each of the coded ESs is treated with a packetizing process within a system-multiplexing portion 9, so that it can be recorded onto the optical disk. For example, it is recorded in the form of a program stream (PS) in accordance with the MPEG 2 Systems. When recording, a standard time information (STC) is counted up within a STC counter 10 upon basis of a standard clock (for example, 27 MHz) of a whole system. When it is changed or converted into PS, a reproduction time information, which is called by a decode time stamp (DST) is added to both the image and the audio, upon basis of the standard time information STC mentioned above. This information is indicative of on which timing the stream portion added with the DST should be decoded, when being decoded. When decoding, in the similar manner to that when encoding, the STC is counted up from the time when staring the reproduction, and decoding is made on the stream of image and audio corresponding thereto at the timing when the STC is coincident with the DTS, thereby enabling to keep synchronization between the image and the audio (i.e., a lip sync) same to that when recording.

In the present embodiment, within the system-multiplexing portion 9, the DTS information is added within Packetized Elementary Stream (PES) of image and audio.

The data packetized within the system-multiplexing portion 9 is transferred to a media drive 11, together with management information for managing recorded data within a disk (i.e., inner-medium logical block information at points of starting and ending of each recording, or correspondence between time information). The media drive 11 controls rotation number (or speed) of the optical disk, laser strength, and a pickup device, thereby recording data onto the optical disk 12 mentioned above.

Next, within the present embodiment, explanation will be made on the operations when reproducing the data recorded on the optical disk. The data recorded on the optical disk 12 is read out from the optical disk by means of the media drive 11, when a user instructs the reproduction thereof, and is transferred to a system separation portion 13. In this system separation portion 13, firstly management information is read out and is transferred to the CPU 22, and after acknowledging the position of desired data on the optical disk therein, such control is made that the streams can be transferred from the media drive 11 to the system separation portion 13 at any time. The image and audio data in the form of ES, being dissolved or removed the header or the like of the packet within system separation portion 13, are transferred to an AudioVideo decoder 14. Counting up of the STC is already started from the time when starting the decoding, within the AudioVideo decoder portion 14, decoding of the respective image and audio data are started from the time when the DTS coincides with the STC, thereby outputting decoded image and decoded audio while bringing the image and audio thereof into synchronous condition. With the image, it is transferred to a picture-in-picture (PinP) block 151. Since only a set of image/audio signals are outputted when conducting this operation, the image is outputted to a liquid crystal display 16 or an output terminal 21 to an external monitor, but without being treated with the PinP process thereon. Also, with the audio, it is outputted to a mixer 17, and is also outputted to a speaker block 19 or an audio output terminal 20 to an outside, through a digital/analog converter circuit 18.

Next, explanation will be made on the operations for recording the second image/audio data while reproducing the first image/audio data, being already recorded, from the optical disk. The reproducing operation of the first image/audio data is similar to that mentioned above. For example, while viewing the image/audio, which are under the reproduction thereof, through the LCD or the monitor connected to the outside, the user pushes down a second image/audio start button at the timing when reaching to a portion where she/he wishes to add the second image/audio data thereto. Upon this, as was mentioned above, the CPU causes the blocks 3 through 11 to conduct the encoding operation. However, with the STC counter, since it already in counted-up condition for decoding, then when encoding, reference is made to the STC value, counting of which was already started when decoding. And, the DTS to be added within the system-multiplexing portion 9 is inserted into the packet, by calculating out the DTS value corresponding to the STC, which is counted up for this decoding. In this instance, an adjustment is made so that, the DTS is added thereto, at the same time of the DTS of the frame of the first image/audio signal, which was displayed on the LCD at the same time when the second image/audio signal is inputted into a lens.

In the operations mentioned above, though a read request for the first image/audio data and a write request for the second image/audio data are inputted to the media drive 11, respectively, from the decoder side and the encoder side; however, the optical disk needs time for switching between the read and write operations, i.e., moving the pickup, etc., thereby brining about an overhead thereof. For reducing this overhead, the CPU 22 makes buffering before transferring the data on the reproducing side and the recording side to the media drive, and thereby conducting the process so as to reduce the number of times of switching.

Also, the correspondence data are recorded into the management information to be recorded onto the optical disk, being indicative of whether the first image/audio data and the second image/audio data are those or not, which should be outputted at the same time in synchronism with the common STC.

With the method mentioned above, it is possible to record the image/audio in synchronism with the reproduced picture, while confirming the image/audio under the reproduction thereof. For example, with using this function, it is possible to reproduce a picture of baseball game, which was already recorded in the outdoor, in the indoor thereafter, and further to take a picture of a coach viewing it, and to take in a picture of him giving technical guidance as the sub-image.

Figure 2A:
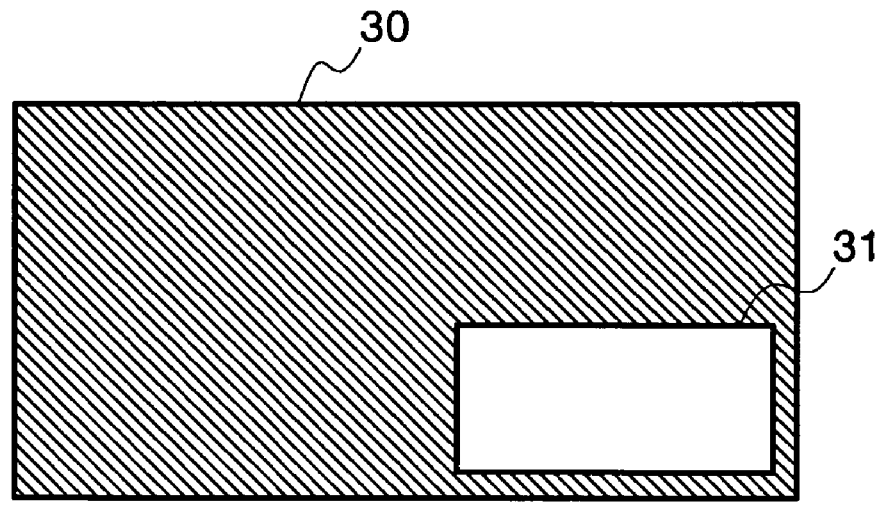
FIGS. 2(A) and 2(B) are views for showing picture-in-picture within the embodiment 1.
Figure 2B:
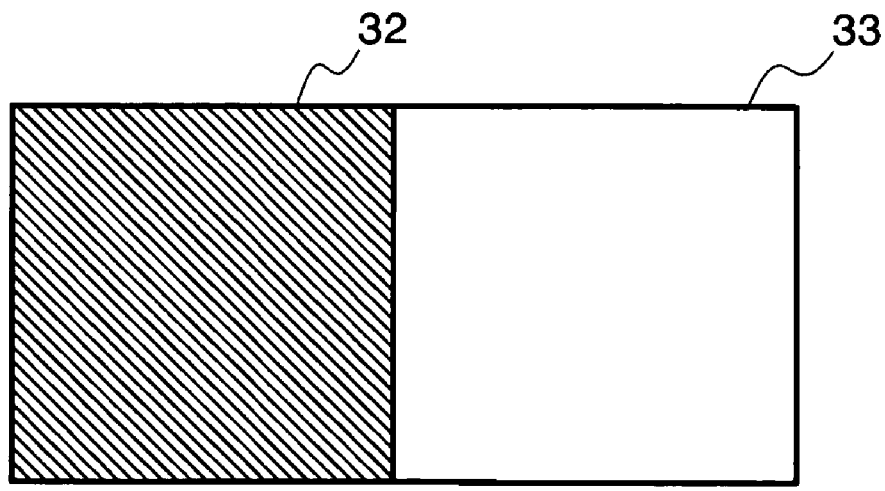

When reproducing the first and second images, simultaneously, reproduction of the first data is started from the media drive. In that instance, since the STC is held in common, being same to the first image/audio data, and the data to be outputted simultaneously is described in the management information, therefore, the CPU 22 makes such control that reading of the first and second image/audio data is conducted by switching to the media driver 12. The first and second data inputted into the system separation portion 13 are inputted into the AudioVideo decoder portion 14 and AudioVideo decoder portion 15, respectively, and each thereof compares the STC value of the STC counter 10, being counted up from the time when starting the decoding, with the DTS, thereby starting the decoding at the stage when they coincide with each other. The image signal outputted is treaded with PinP processing within the PinP circuit 151. The PinP processing, as is shown by reference numerals 30 and 31 in FIG. 2, may takes a mode of outputting the first image of full-screen size combined or synthesized with the second image of a small-screen size, or of outputting them aligning in parallel with each other, as is shown by reference numeral 32 and 33 therein. Also, with the audio signal, the first and second audio signals are mixed into stereo signals, for example, within the mixer circuit 17, and are outputted therefrom.

Embodiment 2

Next, explanation will be made on the operations in case of recording the second image/audio signal during the time when making reproduction bridging over the point of reproducing/stoppage of the first image/audio signal and the point of reproducing/stoppage of the third image/audio signal, and in case when recording is still continuing on the second image/audio signal even after reproducing/stoppage of the third image/audio signal.

FIG. 3 shows each of the image/audio signals (Seq A, B, P, Q, R) and times when it is recorded or reproduced, wherein an upper stage shows the time when recording the first image/audio signal (Seq A) and the third image/audio signal (Seq B), a middle stage shows the time when additionally recording three (3) second image/audio signals (Seq P, Q, R) during when the first and third image/audio signals (Seq A, B) are reproduced, and a lower stage shows the time when reproducing the first, second and third image/audio signals.

Firstly, as is shown in the upper stage, recording is started of the first image/audio signal (Seq A). Being initialized with this start of recording, the STC starts the count-up. And, the first image/audio signal (Seq A) records the STC corresponding thereto as the DTS. This is similar to the encoding shown in embodiment 1. Next, when recording is started of the third image/audio signal (Seq B) after finishing the recording of the first image/audio signal (Seq A), the STC is initialized and the count-up is started since those are independent signals. And then, recording is made on the DTS of the third image/audio signal (Seq B) corresponding to that STC.

Next, as is shown in the middle stage, explanation will be made on the case when recording the second image/audio signals (Seq P, Q, R), additionally, during when the first and third image/audio signals (Seq A, B) are reproduced. Although the first and third image/audio signals (Seq A, B) are separated from each other in timing of recording, as is shown in the upper stage, but the timings of reproducing are continuous, i.e., the reproducing processes thereof are conducted, seamlessly. In that instance, each STC is initialized when the reproduction is started.

In recording of the first one of the second image/audio signal (Seq P), in the similar manner to the embodiment 1, the corresponding STC is recorded to be the DTS, so that it is in synchronism with the STC, which is produced within the reproduction of the first image/audio signal (Seq A).

Though recording of the second one of the second image/audio signal (Seq Q) is basically similar to the embodiment 1, however it differs from in the following aspects: i.e., during recording of the second image/audio signal (Seq Q), reproduction is finished on the first image/audio signal (Seq A), reproduction is started on the third image/audio signal (Seq B), and the STC is initialized. Then, regarding the DTS of the second image/audio signal (Seq Q), before finishing reproduction of the first image/audio signal (Seq A), the corresponding STC is recorded to be the DTS, so that it is in synchronism with the STC of the first image/audio signal (Seq A), and after finishing reproduction of the first image/audio signal (Seq A), the corresponding STC is recorded to be the DTS, so that it is in synchronism with the STC of the third image/audio signal (Seq B). In this instance, when decoding is made on the second image/audio signal (Seq Q), there is caused an inconvenience that correct comparison process cannot be conducted on both values, because discontinuity is caused during the process of confirming the synchronization between the DTS and PTS. For that reason, in the present embodiment, when detecting the discontinuous point of the STC on reproduction side, information is added, being indicative of the discontinuity of the STC, into a packet of the corresponding time, within data of the second image/audio signal.

Though recording of the third one of the second image/audio signal (Seq R) is basically similar to the embodiment 1, however it differs from in the following aspect: i.e., during recording of the second image/audio signal (Seq R), reproducing of the third image/audio signal (Seq B) is finished. Then, in this case, count-up is kept on the STC even after finishing the reproduction of the third image/audio signal (Seq B), and the corresponding STC is recorded to be the DTS, so that it is in synchronism with that continuous STC.

And, as is shown in the lower stage, reproduction of the first, second and third image/audio signals is executed in the following manner. First, reproduction of the first and second image/audio signals (Seq A, P) are similar to that in the embodiment 1. Thus, reproduction is started on the first image/audio signal (Seq A), the STC is initialized to start the count-up thereof, and then reproduction is started on the first image/audio signal (Seq A) while brining the DTS and the STC into synchronism with each other. Then, comparison is made between the DTS and the STC of the second image/audio signal (Seq P), and at the timing when it comes to be the corresponding STC, reproduction is started on the second image/audio signal (Seq P).

Next, reproduction is started on the second image/audio signal (Seq Q), in the similar manner, however it differs from in the following: i.e., during this reproduction, the reproduction of the first image/audio signal (Seq A) is finished, reproduction is started on the third image/audio signal (Seq B), and the STC is initialized. In this case, as was already explained, since the information indicating discontinuity of the STC is added to the DTS of the second image/audio signal (Seq Q), then the second image/audio signal (Seq Q) is reproduced in synchronism with the STC of the first image/audio signal (Seq A) until finishing of reproduction of the first image/ audio signal (Seq A), and thereafter, it is reproduced in synchronism with the STC of the third image/audio signal (Seq B).

Next, reproduction is started on the third one of the second image/audio signal (Seq R), and during this reproduction, the reproduction of the third image/audio signal (Seq B) is finished. In this case, the STC is counted up continuously even if the reproduction is finished of the third image/audio signal (Seq B), and the second image/audio signal (Seq R) is reproduced in synchronism with the STC of the third image/audio signal (Seq B) continued.

Embodiment 3

Next, explanation will be made on a variation of the embodiment 3.

FIG. 4 shows the respective image/audio signals (Seq A, B, P, Q and R) and times when they are recorded or reproduced, in the similar manner to that in FIG. 3, and an upper stage thereof shows times when the first image/audio signal (Seq A) and the third image/audio signal (Seq B), a middle stage shows times when three (3) pieces of the second image/audio signals (Seq P, Q and R) are recorded, additionally, during when reproducing the first and third image/audio signal (Seq A, B), and a lower stage shows the time when reproducing the first, the second and the third image/audio signals. Explanation will be omitted about a portion, which is same to that shown in FIG. 3.

Difference from those shown in FIG. 3 is as shown in the middle stage in FIG. 4; i.e., upon starting the reproduction of the third image/audio signal (Seq B), the STC is initialized in FIG. 3, when recording the second image/audio signals (Seq Q) additionally, however in FIG. 4, the STC is counted up, continuously, in FIG. 4. With doing in this manner, it is possible to achieve timing control on reproduction of the first, second and third image/audio signals (Seq A, B, P, Q and R), with the continuous STC. In this case, as shown in the middle stage in FIG. 4, the DTC of the third image/audio signal (Seq B) must be changed so that it is in synchronism with the STC, which is counted up continuously. Also, since the STC is discontinuous in FIG. 3, then the information indicative of this is added to the DTC of the second one of the second image/audio signal (Seq Q), however it is unnecessary in this FIG. 4.

Embodiment 4

Next, explanation will be made on the case when recording or reproducing a fourth image/audio signal (Seq C), separately, after recording the first, second and third image/audio signals (Seq A, B, P, Q and R), in the manner of the embodiment 2 shown in FIG. 3.

Figure 5:
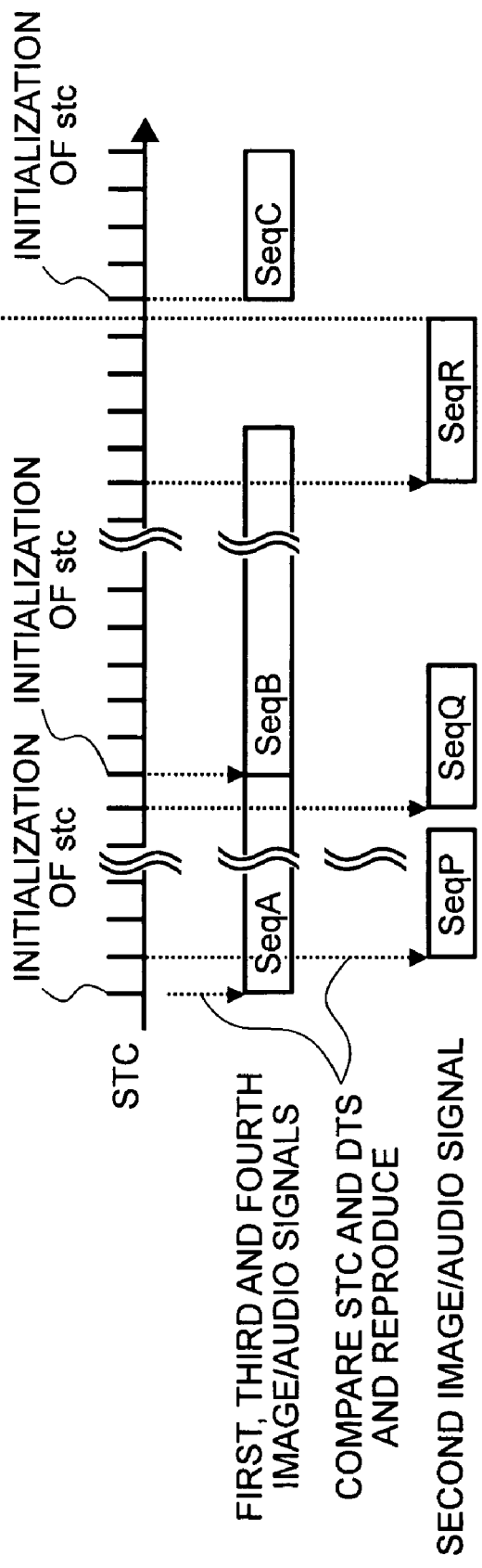
FIG. 5 is a view for showing relationships among first, second, third and fourth image/audio signals and STC, according to an embodiment 4.

FIG. 5 shows the respective image/audio signals (Seq A, B, P, Q and R) and times when they are recorded or reproduced, and further of the fourth image/audio signal (Seq C). As is shown herein, in case when recording or reproducing the fourth image/audio signal (Seq C), separating from the first, second and third image/audio signals (Seq A, B, P, Q and R), the last image/audio signal (Seq R) among the first, second and third image/audio signals (Seq A, B, P, Q and R) is stopped, to initialize the STC thereof, and then fourth image/audio signal (Seq C) is recorded or reproduced.

Further, in case when recording or reproducing the fourth image/audio signal (Seq C) within the embodiment 3 shown in FIG. 4, it is also similar to the above.

While we have shown and described several embodiments in accordance with our invention, it should be understood that disclosed embodiments are susceptible of changes and modifications without departing from the scope of the invention. Therefor, we don not intend to be bound by the details shown and described herein but intend to cover all such changes and modifications that fall within the ambit of the appended claims.

What is claimed is:

1. An image and audio recording/reproducing apparatus, comprising:
    an input portion, into which image/audio data are inputted;
    a recording/reproducing module, which is configured to record/reproduce the image/audio data onto a recording medium; and
    a controller module, which is configured to make such control of producing reproduction time information corresponding to timing of inputting said second image/audio data with respect to reproduction time of the first image/audio data, additionally recording said second image/audio data onto said recording medium together with said reproduction time information, separating from said first image/audio data, and reproducing said second image/audio data upon basis of timing of said reproduction time information when said first image/audio data is reproduced next time, if the second image/audio data is inputted from said input portion when reproducing the first image/audio data recorded on said recording medium.

2. The image and audio recording/reproducing apparatus, as described in the claim 1, wherein
    said controller module makes such control of recording the reproduction time information responding to timing of finishing when finishing an input of the second image/audio data from said input portion, and finishing reproduction of said second image/audio data upon basis of said reproduction time information, after said first image/audio data is reproduced next time and said second image/audio data is reproduced.

3. The image and audio recording/reproducing apparatus, as described in the claim 1, wherein
    a plural number of the second image/audio data are recorded additionally, together with the respective reproduction time information of said plural number of the second image/audio data, with respect to one piece of the first image/audio data.

4. The image and audio recording/reproducing apparatus, as described in the claim 1, wherein
    said reproduction timing information is in synchronism with standard time information, which is produced when said first image/audio data is reproduced.

5. The image and audio recording/reproducing apparatus, as described in the claim 4, wherein
    timing of reproducing said second image/audio data when reproducing said first image/audio data is changed by changing said reproduction time information, which is added and recorded to said second image/audio data, after recording said second image/audio data.

6. The image and audio recording/reproducing apparatus, as described in the claim 5, wherein
    the standard time information produced when reproducing said first image/audio data is produced, continuously, and said reproduction time information added to said second image/audio data is produced in synchronism with said standard time information, which is produced continuously, in case when reproducing said first image/audio data is finished during when reproducing said first image/audio data and when inputting the second image/audio data from said input portion and recording it additionally.

7. The image and audio recording/reproducing apparatus, as described in the claim 6, wherein
said standard time information is produced, continuously, and said second image/audio data is reproduced to be in synchronism with the standard time information, which is produced by continuing the reproduction time information added to said second image/audio data, in case when reproduction of said first image/audio data is finished during when reproducing said first image/audio data and when reproducing the second image/audio data so that the reproduction time information added to said second image/audio data is in synchronism with the standard time information relating to said first image/audio data.

8. The image and audio recording/reproducing apparatus, as described in the claim 5, wherein
production of the standard time information relating to said first image/audio data is finished, production of the standard time information relating to a third image/audio data is started, and the reproduction time information to be added to said second image/audio data after finishing the reproduction of said first image/audio data is produced to be in synchronism with the standard time information relating to said third image/audio data, in case when reproduction of said first image/audio data is finished and thereafter when the third image/audio data is reproduced following thereto, during when reproducing said first image/audio data and when the second image/audio data is inputted from said input portion to be recorded additionally.

9. The image and audio recording/reproducing apparatus, as described in the claim 8, wherein
information indicative of discontinuity of the standard time information, which said reproduction time information is in synchronism with, is added to the reproduction time information to be added to said second image/audio data.

10. The image and audio recording/reproducing apparatus, as described in the claim 8, wherein
production is finished of said first image/audio data, and production is started of the standard time information of said third image/audio data, thereby reproducing the second image/audio data so that the reproduction time information added to said second image/audio data is in synchronism with the standard time information of said third image/audio data in case when reproduction of said first image/audio data is finished and when said third image/audio data is reproduced, during when reproducing said first image/audio data and when reproducing the second image/audio data so that the reproduction time information added to said second image/audio data is in synchronism with the standard time information relating to said first image/audio data.

11. The image and audio recording/reproducing apparatus, as described in the claim 4, wherein
production is continued of the standard time information relating to said first image/audio data, the reproduction time information to be added to said second image/audio data is produced to be in synchronism with said standard time information, which is produced continuously, and the reproduction time information added to said third image/audio data is renewed to be in synchronism with said standard time information, which is produced continuously, in case when reproduction of said first image/audio data is finished, and thereafter when the third image/audio data is reproduced, during when reproducing said first image/audio data and when inputting the second image/audio data from said input portion and recording it additionally.

12. The image and audio recording/reproducing apparatus, as described in the claim 11, wherein
production is continued of the standard time information of said first image/audio data, the second image/audio data is reproduced so that the production time information added to said second image/audio data is in synchronism with said standard time information, which is produced continuously, and the third image/audio data is reproduced so that the reproduction time information added to said third image/audio data is in synchronism with said standard time information, which is produced continuously, in case when reproduction of said first image/audio data is finished, and thereafter when said third image/audio data is reproduced following thereto, during when reproducing said first image/audio data and when reproducing the second image/audio data so that the reproduction time information added to said second image/audio data is in synchronism with the standard time information relating to said first image/audio data.

* * * * *